United States Patent
Chung et al.

[11] Patent Number: 6,104,161
[45] Date of Patent: Aug. 15, 2000

[54] CAPACITIVE AC ISOLATION APPARATUS FOR ELECTRIC VEHICLE BATTERY CHARGING SYSTEMS

[75] Inventors: Sung Chung, Fullerton; Joseph Lansford, Los Angeles; John G. Hayes, Redondo Beach; Vito J. Marchione, Panorama City; Kwang Yi, Los Angeles, all of Calif.

[73] Assignee: General Motors Corporation, Detroit, Mich.

[21] Appl. No.: 09/307,855

[22] Filed: May 10, 1999

[51] Int. Cl.$^7$ .................................. H02J 7/00; H01G 4/35
[52] U.S. Cl. ............................................. 320/109; 361/302
[58] Field of Search ..................................... 320/104, 109; 361/302, 321.6, 321.2

[56] References Cited

U.S. PATENT DOCUMENTS

| | | | |
|---|---|---|---|
| 5,714,864 | 2/1998 | Rose et al. ............................... | 320/109 |
| 5,835,338 | 7/1998 | Suzuki et al. ........................... | 361/301.4 |
| 5,912,798 | 6/1999 | Chu ........................................ | 361/321.3 |
| 5,940,264 | 8/1999 | Stevens et al. .......................... | 361/514 |
| 5,996,218 | 12/1999 | Shamouilian et al. .................. | 361/234 |
| 6,008,980 | 12/1999 | Stevenson et al. ...................... | 361/302 |
| 6,037,745 | 7/1998 | Suzuki et al. ........................... | 361/301.4 |
| 6,046,091 | 6/1998 | Quick et al. ............................. | 438/396 |

*Primary Examiner*—Peter S. Wong
*Assistant Examiner*—Pia Tibbits
*Attorney, Agent, or Firm*—Anthony Luke Simon

[57] ABSTRACT

AC isolation apparatus, such as is provided by an AC isolation capacitor disposed between unexposed and exposed portions of the chassis of a charging system or an electric vehicle. The AC isolation apparatus or capacitor provides a high impedance at 50/60 Hertz between the electric vehicle and the charging system, thus isolating their respective chassis grounds.

20 Claims, 2 Drawing Sheets

CAPACITIVE AC ISOLATION APPARATUS FOR ELECTRIC VEHICLE BATTERY CHARGING SYSTEMS

BACKGROUND OF THE INVENTION

The present invention relates generally to electric vehicles and charging systems, and more particularly, to apparatus employed in a charging system that provides for AC isolation while charging batteries of an electric vehicle.

The assignee of the present invention designs and manufactures electric vehicles and charging systems used to charge batteries of such electric vehicles. The charging systems have a ground connection, such as a rod or other conductor, that provides an electrical low impedance path to earth.

In cases of an inefficient ground connection to earth, a chassis of an electric vehicle that has no connection with earth ground. Since it has rubber tires, it can float at high voltages with respect to earth ground when a charging or other electrical source is connected to it. The present invention provides a solution to this potential float of chassis voltage.

It would therefore be desirable to have apparatus for use in a charging system that provides for AC isolation while charging batteries of an electric vehicle. It would also be desirable to have a tubular capacitor that provides for AC isolation while charging batteries of an electric vehicle.

SUMMARY OF THE INVENTION

The present invention comprises an AC isolation capacitor ($C_{ISO}$) disposed between unexposed and exposed portions of the chassis of a charging system for an electric vehicle. The AC isolation capacitor provides a high impedance at 50/60 Hertz between the electric vehicle and the charging system, thus isolating the chassis grounds of the charging system and the electric vehicle and reducing the voltage present at the exposed portion of the chassis for a given ground current.

A relatively low capacitance value selected for the isolation capacitor provides a maximum amount of isolation. However, for most applications, the EMI performance of the charging system depends on good solid grounding of the chassis to control the amount of common mode current that is radiated. Consequently, the value of the isolation capacitor is selected to balance EMI performance and isolation.

The present invention provides enhanced isolation during charging in the event of a ground fault.

The specific application of the present invention is in an electrical vehicle charging system, such as one manufactured by the assignee of the present invention. The charging system has a charge coupler paddle containing an inductive coupler that is coupled to an AC power source. The electric vehicle has a charge port into which the charge coupler paddle is inserted to charge the batteries of the electric vehicle. Due to the unique shape of available space inside the charge coupler paddle, there was no available device that could fit inside the charge coupler paddle and provide the necessary functions required for termination to the ground path.

The present invention provides 50/60 Hz ground isolation to provide chassis isolation during charging of an electric vehicle, particularly in wet weather charging. To provide such ground isolation, it is necessary to add an AC isolation capacitor between the unexposed and the exposed portions of the chassis. The specific location for the AC isolation capacitor is inside the charge coupler paddle, that the user holds in his or her hand.

BRIEF DESCRIPTION OF THE DRAWINGS

The present invention is now described by way of example with reference to the following drawings in which.

DETAILED DESCRIPTION

Figure 1:
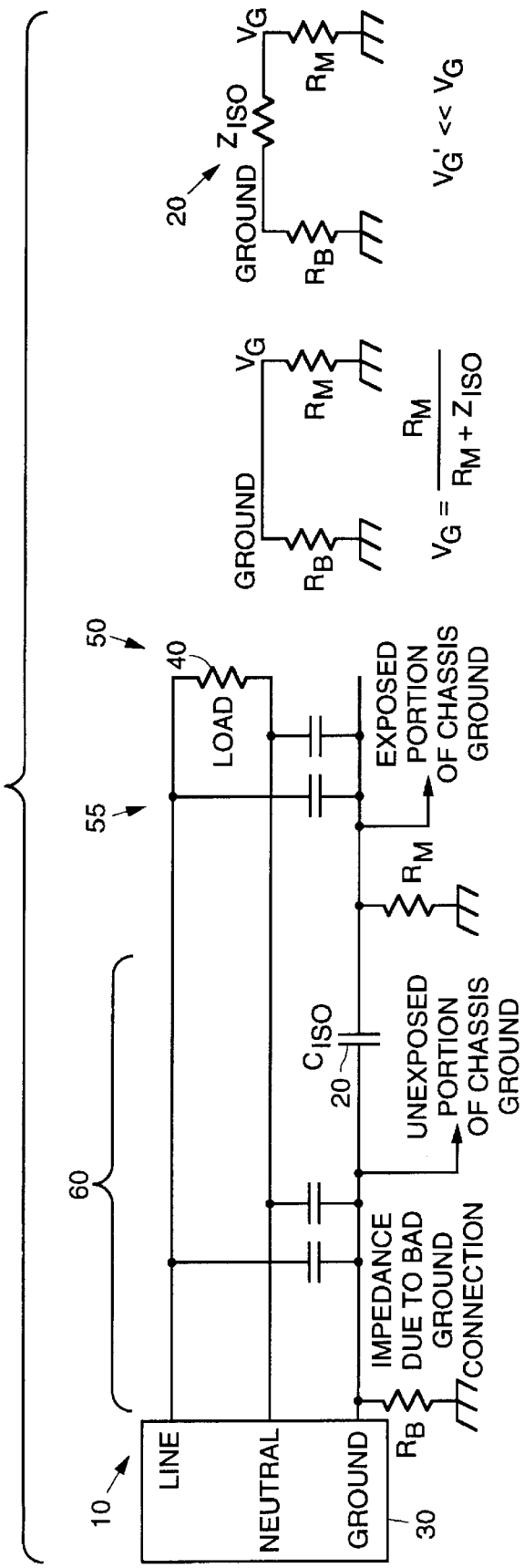
FIG. 1 illustrates an exemplary circuit employing an AC isolation capacitor in accordance with the principles of the present invention, and electrical circuit diagrams with and without the AC isolation capacitor.

Referring to the drawing figures, FIG. 1 illustrates an exemplary circuit 10 employing an AC isolation capacitor ($C_{ISO}$) 20 in accordance with the principles of the present invention, and electrical circuit diagrams with and without the AC isolation capacitor 20. The circuit 10 comprises an AC line, along with neutral and ground wires that are coupled from a charging system 30 to a load 40, such as batteries of an electric vehicle 50, for example.

The charging system 30 is coupled to the load 40 of the electric vehicle 50 by means of a charge coupler paddle 60 comprising an inductive coupler that is coupled to an AC power source in the charging system 30. The electric vehicle 50 has a charge port 55 into which the charge coupler paddle 60 is inserted to charge the batteries of the electric vehicle 50.

The isolation impedance ($Z_{ISO}$) provided by the AC isolation capacitor 20 is given by the equation:

$$Z_{ISO} = \frac{1}{2\pi f C_{ISO}}.$$

The electrical circuit without the AC isolation capacitor 20 is shown at the immediate right of the circuit 10. The voltage without the AC isolation capacitor 20 is given by the equation:

$$V'_G = \frac{R_M}{R_M + Z_{ISO}} V_G.$$

The electrical circuit including the AC isolation capacitor 20 is shown at the far right of FIG. 1. The voltage with the AC isolation capacitor 20 in the circuit 10 is: $V_G' \ll V_G$.

The circuit 10 is shown having an impedance ($R_B$) that is due to an inefficient ground connection, and an impedance ($R_M$) due to a person touching an exposed portion of the chassis of the charging system 30 or the electric vehicle 50. Capacitances are shown that exist between the line and neutral wires and between the line and ground wires.

The AC isolation capacitor 20 is coupled between the unexposed portion of the chassis of the charging system 30 and the exposed portion of the chassis of the charging system 30 or electric vehicle 50. The AC isolation capacitor 20 provides a high impedance at 50/60 Hertz between the electric vehicle 50 and the charging system 30. The AC isolation capacitor 20 isolates the respective chassis grounds of the electric vehicle 50 and the charging system 30. The AC isolation capacitor 20 reduces the voltage present at the exposed portion of the chassis of the electric vehicle 50 for a given ground current. Thus, there is little if any current seeking a path from the exposed portion of the chassis to ground.

A relatively low capacitance value may be selected for the AC isolation capacitor 20 to provide a maximum amount of isolation and greater protection. However, for most applications, the EMI performance of the charging system 20 depends on good solid grounding of the chassis to limit the amount of common mode current that is radiated. Thus, the value of the AC isolation capacitor 20 is selected to balance EMI performance and isolation.

The elimination of a direct connection to DC ground eliminates the possibility of elevated chassis voltage in the event of a ground fault. The AC isolation capacitor 20 provides 50/60 Hz ground isolation to prevent chassis voltage elevation during charging of the electric vehicle 50, particularly in wet weather charging.

The present invention was specifically developed for use in an electrical vehicle charging system 30, such as one manufactured by the assignee of the present invention. The charging system 30 has a charge coupler paddle 60 containing an inductive coupler that is coupled to an AC power source. The electric vehicle 50 has a charge port 55 into which the charge coupler paddle 60 is inserted to charge the batteries of the electric vehicle.

Due to the unique shape of the available space inside the charge coupler paddle 60, no readily available device could easily fit inside the charge coupler paddle 60 to provide the necessary functions required for termination of the ground path. Consequently, a unique capacitive device comprising a feedthrough AC isolation capacitor 20 was developed that is part of the charge coupler paddle 60. An exemplary conceptual design of the feedthrough AC isolation capacitor 20 is shown in FIG. 2, while a typical specification for the feedthrough AC isolation capacitor 20 is shown in FIG. 3.

Figure 2:
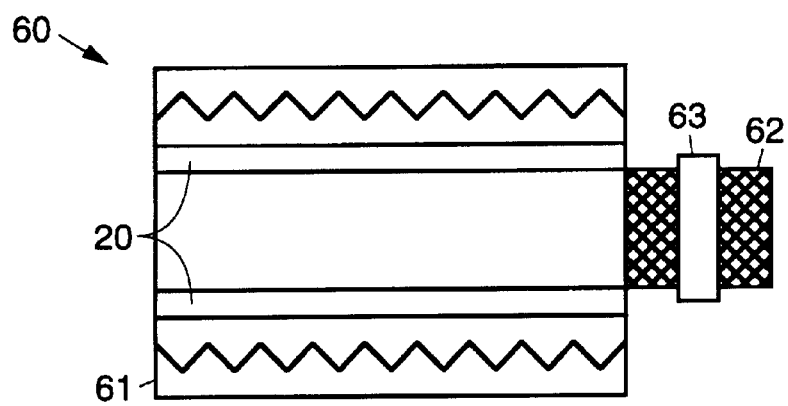
FIG. 2 illustrates a conceptualized view of a ceramic AC isolation capacitor embodied in a portion of a charging paddle of a charging system of an electric vehicle.

Referring to FIG. 2, it illustrates a conceptualized view of a feedthrough AC isolation capacitor 20 embodied in a portion of a charging paddle of a charging system 30 of an electric vehicle 50. The feedthrough AC isolation capacitor 20 shown in FIG. 2 comprises a tubular ceramic capacitor 20. The feedthrough AC isolation capacitor 20 is disposed in a cylindrical opening through a portion of the charge coupler paddle 60. The AC wires (line, neutral and ground wires) are enclosed within an outer braided shield 62 and are surrounded by the feedthrough AC isolation capacitor 20. The outer braided shield 62 is secured to the feedthrough AC isolation capacitor 20 by means of a crimping band 63, for example, to ensure EMI shielding continuity. An outer portion 61 of the conductive plastic paddle 60 surrounding the feedthrough AC isolation capacitor 20 may have a spiral shape as shown in FIG. 2, for example.

Figure 3:
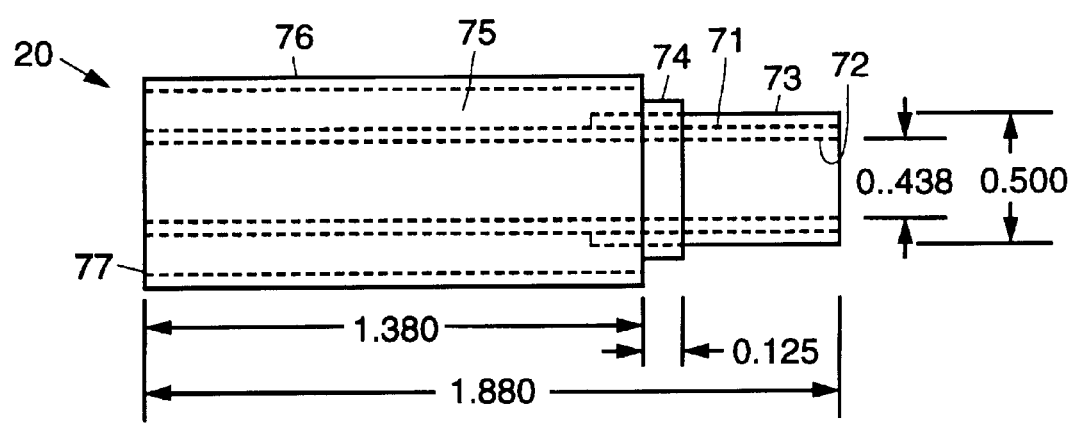
FIG. 3 illustrates a side view of an exemplary reduced to practice feedthrough AC isolation capacitor.

FIG. 3 illustrates a side view of an exemplary reduced to practice feedthrough AC isolation capacitor 20. The feedthrough AC isolation capacitor 20 comprises a thin walled central plastic tube 71 with an axial opening 72 that permits passage of AC wires therethrough. The central plastic tube 71 has a conductive outer surface 73 comprising a plurality of wrapped conductive foil layers 73 that extends part way along the length of the tube 71. The conductive foil layers 73 may be copper foil, for example.

A capacitive member 75 that comprises a plurality of wrapped layers of capacitive material 75 surrounds the central plastic tube 71 around the portion of the tube 71 that is not covered by the conductive foil layers 73. About 200 layers of capacitive material was wrapped around the central plastic tube 71 in the reduced to practice AC isolation capacitor 20.

An outer conductive cylindrical member 76 that may be comprised of tin plated thin walled brass tubing surrounds the plurality of wrapped layers of capacitive material 75. The outer conductive cylindrical member 76 is soldered 77 or otherwise terminated 77 to the layers of capacitive material 75 of the cylindrical dielectric member 75 at an end of the AC isolation capacitor 20 distal from the conductive outer surface 73. An insulating barrier member 74 is disposed adjacent to the outer conductive cylindrical member 76 at an interface between the conductive foil layers 73 and the layers of capacitive material 75 and outer conductive cylindrical member 76. Interior ends of the wrapped conductive foil layers 73 extend past the insulating barrier member 74 about 0.25–0.50 inches to allow termination of the conductive foil layers 73 to the layers of capacitive material 75.

AC wires (not shown) including line, neutral and ground wires, are slid through the opening 72 through the central plastic tube 71. The AC wires are enclosed within an outer braided shield 62 (shown in FIG. 2) that is clamped to the wrapped conductive foil layers 73 comprising the conductive outer surface 73 using the a crimping band 63. The insulating barrier member 74 provides a barrier so that the outer braided shield 62 does not short to the outer conductive cylindrical member 76.

Typical dimensions of the components of the reduced to practice feedthrough AC isolation capacitor 20 are shown in FIG. 3. The capacitance value of the reduced to practice AC isolation capacitor 20 is 0.47 microfarads ±10% at 200 VDC.

Thus, apparatus employed in a charging system that provides for AC isolation while charging batteries of an electric vehicle has been disclosed. It is to be understood that the above-described embodiments are merely illustrative of one of the many specific embodiments that represent applications of the principles of the present invention. Clearly, numerous and other arrangements can be readily devised by those skilled in the art without departing from the scope of the invention.

What is claimed is:

1. Isolation apparatus for use in a charging system when charging an electric vehicle, comprising:

an AC isolation capacitor coupled between an unexposed portion of a chassis of the charging system and an exposed portion of the chassis of the charging system or electric vehicle.

2. The apparatus recited in claim 1 wherein the AC isolation capacitor comprises a feedthrough AC isolation capacitor that is part of a charge coupler paddle of a charging system for an electric vehicle.

3. The apparatus recited in claim 2 wherein the AC isolation capacitor comprises a high impedance at 50/60 Hertz between the electric vehicle and the charging system.

4. The apparatus recited in claim 2 wherein the AC isolation capacitor reduces the voltage present at the exposed portion of the chassis of the electric vehicle for a given ground current.

5. The apparatus recited in claim 2 wherein the AC isolation capacitor comprises tubular ceramic capacitor.

6. The apparatus recited in claim 1 wherein the AC isolation capacitor comprises:

a central plastic tube having an axial opening therethrough and having a conductive outer surface that extends part way along the length of the tube;

a capacitive member surrounding the portion of the central plastic tube not covered by the conductive outer surface; and an outer conductive member surrounding the capacitive member.

7. The apparatus recited in claim 6 further comprising an insulating barrier member disposed adjacent to the outer conductive cylindrical member at an interface between the conductive foil layers and the plurality of wrapped layers of capacitive material.

8. The apparatus recited in claim 7 wherein the outer conductive cylindrical member is terminated to the capacitive member and the conductive outer surface extends past the insulating barrier member to allow termination to the capacitive member.

9. The apparatus recited in claim 6 wherein the outer conductive cylindrical member comprises tin plated brass tubing.

10. The apparatus recited in claim 6 wherein the conductive outer surface comprising a plurality of wrapped conductive foil layers.

11. The apparatus recited in claim 6 wherein the capacitive member comprises a plurality of wrapped layers of capacitive material.

12. The apparatus recited in claim 1 wherein a relatively low capacitance value is selected for the AC isolation capacitor.

13. The apparatus recited in claim 1 wherein the value of the AC isolation capacitor is selected to balance EMI performance and isolation.

14. Apparatus comprising:

a charging system comprising a charge coupler paddle 60 that is inserted into a charge port of an electric vehicle to charge its batteries; and an AC isolation capacitor coupled between an unexposed portion of a chassis of the charging system and an exposed portion of the chassis of the charging system or electric vehicle that comprises a high impedance at 50/60 Hertz between the electric vehicle and the charging system.

15. The apparatus recited in claim 14 wherein the AC isolation capacitor comprises:

a central plastic tube having an axial opening therethrough and having a conductive outer surface that extends part way along the length of the tube;

a capacitive member surrounding the portion of the central plastic tube not covered by the conductive outer surface; and an outer conductive member surrounding the capacitive member.

16. The apparatus recited in claim 15 further comprising an insulating barrier member disposed adjacent to the outer conductive cylindrical member at an interface between the conductive foil layers and the plurality of wrapped layers of capacitive material.

17. The apparatus recited in claim 16 wherein the outer conductive cylindrical member is terminated to the capacitive member and the conductive outer surface extends past the insulating barrier member to allow termination to the capacitive member.

18. The apparatus recited in claim 15 wherein the outer conductive cylindrical member comprises tin plated brass tubing.

19. The apparatus recited in claim 15 wherein the conductive outer surface comprising a plurality of wrapped conductive foil layers.

20. The apparatus recited in claim 15 wherein the capacitive member comprises a plurality of wrapped layers of capacitive material.

* * * * *